US012662182B2

(12) United States Patent
Brahmi et al.

(10) Patent No.: US 12,662,182 B2
(45) Date of Patent: Jun. 23, 2026

(54) STEERING COLUMN EQUIPPED WITH A DEVICE FOR DETECTING THE FORCES APPLIED TO THE STEERING WHEEL

(71) Applicant: Robert Bosch Automotive Steering Vendome SAS, Vendome (FR)

(72) Inventors: Omar Brahmi, Vendôme (FR); Laurent Fevre, Saint Sulpice (FR); Eddy Dupont, Cloyes sur le Loir (FR); Franck Boussemart, Sainte-Anne (FR)

(73) Assignees: Robert Bosch Automotive Steering Vendome, Vendome (FR); Robert Bosch GmbH, Stuttgart (DE)

( * ) Notice: Subject to any disclaimer, the term of this patent is extended or adjusted under 35 U.S.C. 154(b) by 652 days.

(21) Appl. No.: 17/922,494

(22) PCT Filed: May 17, 2021

(86) PCT No.: PCT/EP2021/062998
§ 371 (c)(1),
(2) Date: Oct. 31, 2022

(87) PCT Pub. No.: WO2021/233829
PCT Pub. Date: Nov. 25, 2021

(65) Prior Publication Data
US 2023/0192172 A1      Jun. 22, 2023

(30) Foreign Application Priority Data
May 18, 2020    (FR) ...................................... 2004962

(51) Int. Cl.
*B62D 1/18* (2006.01)
*G01L 5/22* (2006.01)

(52) U.S. Cl.
CPC ................ *B62D 1/18* (2013.01); *G01L 5/221* (2013.01)

(58) Field of Classification Search
CPC .. B62D 1/18; B62D 1/16; B62D 1/185; G01L 5/221; G01L 1/16
See application file for complete search history.

(56) References Cited

U.S. PATENT DOCUMENTS

| | | | | |
|---|---|---|---|---|
| 2006/0169525 A1* | 8/2006 | Saito | ...................... | B62D 5/043 |
| | | | | 180/444 |
| 2016/0368522 A1* | 12/2016 | Lubischer | .............. | B62D 1/105 |

(Continued)

FOREIGN PATENT DOCUMENTS

| | | | | |
|---|---|---|---|---|
| DE | 102014200933 B4 * | 12/2015 | ............. | B62D 1/185 |
| FR | 2879990 A1 * | 6/2006 | ............. | B62D 1/105 |

(Continued)

OTHER PUBLICATIONS

Lou et al. JP 2009 078712 Machine English Translation, ip.com (Year: 2009).*

(Continued)

*Primary Examiner* — Karen Beck

(74) *Attorney, Agent, or Firm* — Maginot, Moore & Beck LLP

(57) ABSTRACT

A steering column includes a support base intended to be mounted fixedly with respect to a vehicle chassis. The steering column further includes a steering member on which a vehicle steering wheel is mounted. The steering member includes a transmission shaft mounted so as to rotate with respect to the support base about a longitudinal main axis. The steering column also includes at least one force sensor that is interposed between a first non-rotating element of the steering column and a second non-rotating element belonging either to the steering column or to the chassis of the vehicle.

10 Claims, 3 Drawing Sheets

(56)          References Cited

U.S. PATENT DOCUMENTS

| | | | | |
|---|---|---|---|---|
| 2017/0057539 A1 * | 3/2017 | Kim | ........................ | F16H 55/22 |
| 2018/0154932 A1 * | 6/2018 | Rakouth | ................ | B62D 1/286 |
| 2019/0202494 A1 | 7/2019 | Itou et al. | | |

FOREIGN PATENT DOCUMENTS

| | | | | | | |
|---|---|---|---|---|---|---|
| JP | 2004262266 | A | * | 9/2004 | ............ | B62D 1/185 |
| JP | 2009078712 | A | * | 4/2009 | | |
| JP | 2023007715 | A | * | 1/2023 | | |
| WO | WO-2017129461 | A1 | * | 8/2017 | ............ | B62D 1/185 |
| WO | WO-2019228952 | A1 | * | 12/2019 | ............... | B62D 3/12 |
| WO | WO-2022045346 | A1 | * | 3/2022 | ............ | B62D 1/181 |

OTHER PUBLICATIONS

International Search Report corresponding to PCT Application No. PCT/EP2021/062998, mailed Jul. 22, 2021 (English language document) (3 pages).

* cited by examiner

STEERING COLUMN EQUIPPED WITH A DEVICE FOR DETECTING THE FORCES APPLIED TO THE STEERING WHEEL

This application is a 35 U.S.C. § 371 National Stage Application of PCT/EP2021/062998, filed on May 17, 2021, which claims the benefit of priority to Serial No. FR2004962, filed on May 18, 2020 in France, the disclosures of which are incorporated herein by reference in their entirety.

The present invention relates to a vehicle steering column, in particular designed to be used in a motor vehicle that is able to operate in a manual driving, or assisted driving, mode, and in a delegated driving, or autonomous driving, mode.

BACKGROUND

In a vehicle, the steering column transmits the rotation of the steering wheel to the wheels so as to modify the orientation thereof, for example in the following order: the steering wheel, the steering column, the intermediate shaft, the rack and finally the wheels.

Certain motor vehicles can be equipped with a driving assistance system allowing the driver to at least temporarily delegate driving of the vehicle to a central control unit. It is then a delegated driving mode, or automatic or autonomous driving mode. In such a case, it is important to know how to detect the intention of the driver to return to driving in manual mode. This wish detection allows the vehicle to ensure that the driver is aware that he or she is once again responsible for driving. The driver plays an active role in returning to a manual driving mode after driving in delegated mode.

It is known practice to measure the force applied by the driver to the transmission shaft or to the steering wheel in order to detect the wish of the driver to bring the steering wheel closer and return it to a comfortable driving position.

SUMMARY

However, this type of solution is not entirely satisfactory since it requires detection systems that are sometimes complex and expensive. For example, some of the known systems require an electrical connection to be put in place on a rotating component.

The invention aims to remedy the abovementioned problems by proposing a simple and economical solution.

The invention proposes a steering column comprising:
a support base intended to be mounted fixedly with respect to a vehicle chassis,
a steering member on which a vehicle steering wheel is mounted, the steering member comprising a transmission shaft mounted so as to rotate with respect to the support base about a longitudinal main axis,
characterized in that it has at least one force sensor that is interposed between a first non-rotating element of the steering column and a second non-rotating element belonging either to the steering column or to the chassis of the vehicle.

Thus the invention makes it possible to detect the forces exerted by the driver on the steering wheel in a precise manner and makes it possible to trigger, depending on predetermined criteria, an operation such as the movement of the steering wheel so as to allow the driver to resume control in manual mode.

According to other advantageous features:
at least one force sensor is interposed radially between the first non-rotating element and the second non-rotating element;
at least one force sensor is interposed axially between the first non-rotating element and the second non-rotating element;
the first non-rotating element is an annular component of longitudinal axis, which has a first inner recess designed to receive an outer ring of a rolling bearing of the transmission shaft;
the second non-rotating element has an annular body of longitudinal axis and a second inner recess is formed in the annular body so as to receive the first non-rotating element;
the second inner recess is delimited by a first radial wall and by an axial wall of the annular body and also by a second radial wall belonging to an end sleeve that is fastened to the annular body;
the second non-rotating element is fastened to a tube that is mounted so as to slide longitudinally in the support base so as to be able to adjust the longitudinal position of the steering wheel, the transmission shaft being connected to the support base by way of the sliding tube;
the first non-rotating element is fastened to the support base of the steering column, and the force sensor is arranged on the support base of the steering column so as to be able to be interposed between the support base and an element of the chassis of the vehicle;
each force sensor has a strain gauge;
at least one force sensor is configured to detect a shear force;
at least one force sensor is configured to detect a compressive or tensile force;
the column has a plurality of force sensors that are distributed circumferentially around the transmission shaft;
the column has an electronic control unit that is configured to use the information provided by the one or more force sensors in order to detect a particular haptic sequence applied by the driver to the steering wheel and is configured to trigger a determined operation depending on the haptic sequence detected.

BRIEF DESCRIPTION OF THE DRAWINGS

Other features and advantages of the present invention will become more clearly apparent upon reading the following detailed description of an embodiment of the invention that is given by way of non-limiting example and is illustrated by the appended drawings, in which:

FIG. 6 is a view similar to that in FIG. 4 on the plane 6-6 in FIG. 5 that shows the second embodiment;

FIG. 7 is a block diagram that shows the steering column 10 of the vehicle in FIG. 1 equipped with force sensors according to one of the embodiments of the invention.

DETAILED DESCRIPTION

Figure 1:
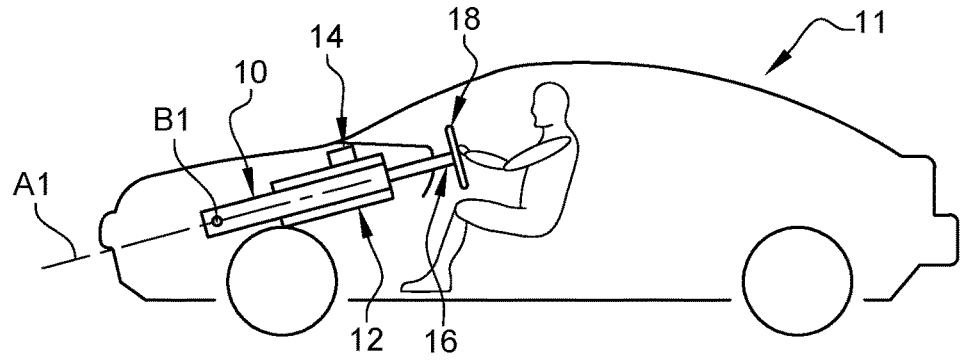
FIG. 1 is a diagram that shows a motor vehicle equipped with a steering column in accordance with the teachings of the invention.
Figure 2:
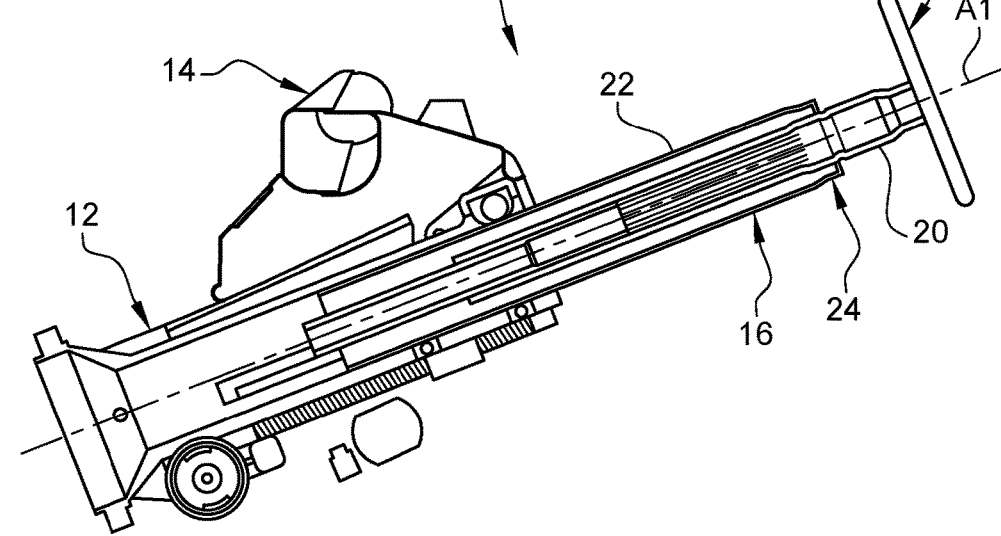
FIG. 2 is a view in longitudinal axial section that shows the steering column in FIG. 1.

FIG. 1 shows a motor vehicle 11 equipped with a steering column 10. The steering column 10, which is shown in greater detail in FIG. 2, comprises a support base 12 intended to be mounted fixedly with respect to the chassis of the vehicle 11, for example fastened to a crossmember 14. The steering column 10 comprises a steering member 16 on which a steering wheel 18 rotating about a longitudinal main axis A1 is mounted.

The steering column 10 can also be mounted so as to pivot about a transverse axis B1 so as to allow its inclination to be adjusted.

In the rest of the description, use will be made, by way of non-limiting example, of a bottom-to-top orientation along the longitudinal axis A1, with the top corresponding to the axial end provided with the steering wheel 18.

The steering member 16 comprises a transmission shaft 20 mounted so as to rotate with respect to the support base 12 about the longitudinal main axis A1. According to the embodiment shown here, the transmission shaft 20 bears the steering wheel 18 at its upper axial end and the transmission shaft 20 is guided in rotation inside a tube 22 that is mounted so as to slide longitudinally in the support base 12 so as to be able to adjust the depth of the steering column 10.

Figure 3:
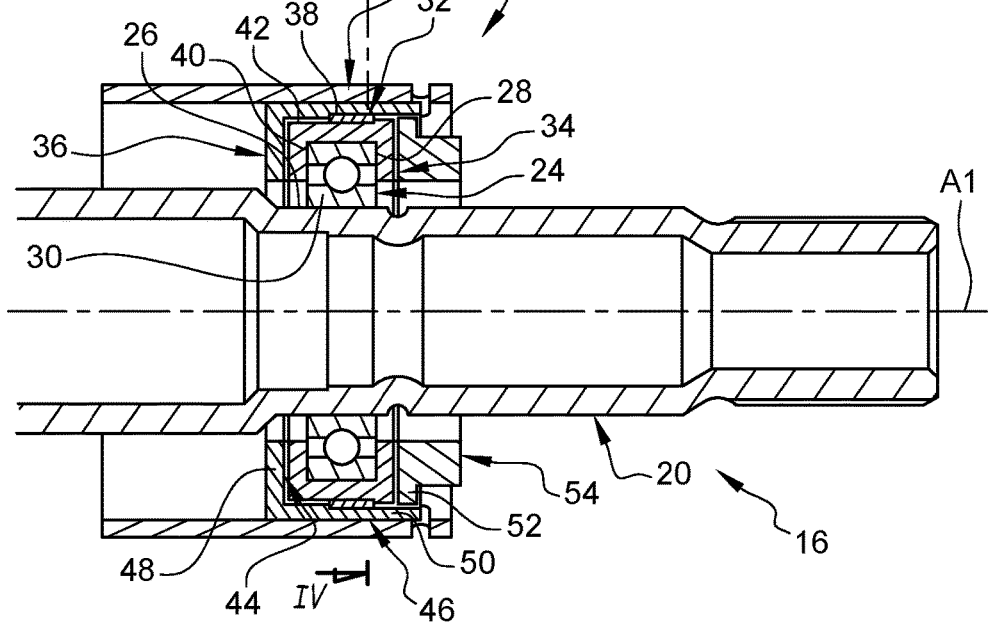
FIG. 3 is a view in longitudinal axial section that shows a detail of the top part of the steering column in FIG. 2 showing the arrangement of a force sensor in accordance with a first embodiment of the invention.

As shown in FIG. 3, the transmission shaft 20 is in this case guided in rotation by means of a column-top rolling bearing 24 that is arranged in the top part of the tube 22, between the tube 22 and the external axial surface 26 of the transmission shaft 20.

The column-top rolling bearing 24 in this case has an outer rolling-bearing ring 28, on the side of the tube 22, and an inner rolling-bearing ring 30, on the side of the transmission shaft 20.

Figure 4:
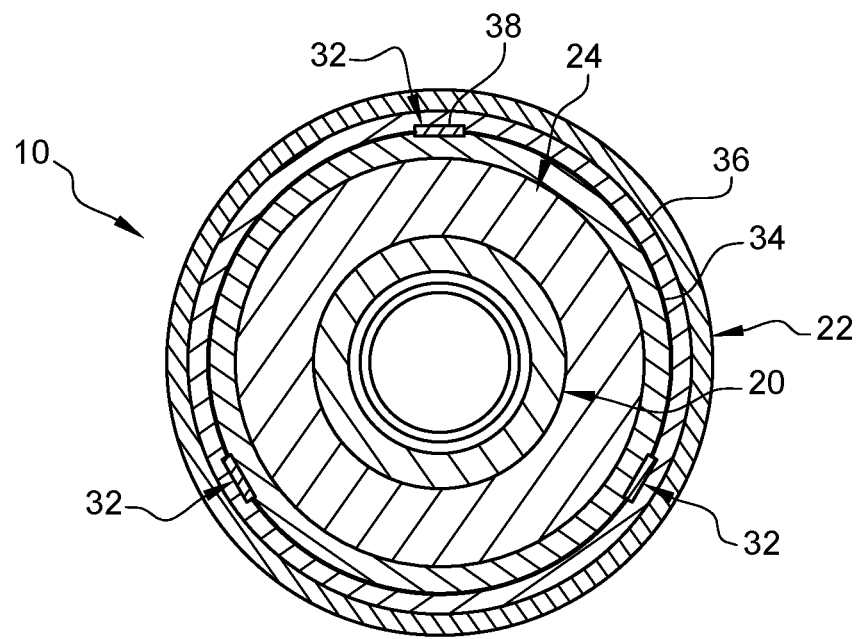
FIG. 4 is a cross-sectional view on the plane 4-4 in FIG. 3 that shows the arrangement of the force sensors according to the first embodiment of the invention.

According to the first embodiment, which is shown in FIGS. 3 and 4, the steering column 10 has three force sensors 32 that are interposed between a first non-rotating element 34 of the steering column 10 and a second non-rotating element 36 of the steering column 10.

Advantageously, the three force sensors 32 are distributed circumferentially around the transmission shaft 20 in a regular manner, with a space of approximately 120 degrees between each force sensor 32.

Alternatively, there could be only a single force sensor 32 or only two force sensors 32 diametrically opposite one another relative to the longitudinal axis A1, or else four force sensors 32, distributed every 90 degrees.

According to this first embodiment, each force sensor 32 is interposed radially between the first non-rotating element 34 and the second non-rotating element 36. The force sensor 32 preferably has a strain gauge 38 that is designed to detect a shear force, i.e. in this case a relative movement of the first non-rotating element 34 relative to the second non-rotating element 36 in a longitudinal direction. This allows the force sensor 32 to measure the longitudinal component of the forces exerted by the driver on the steering wheel 18.

The strain gauge 38 is for example of the resistive type or of the piezoelectric type. In the case of a strain gauge 38 of the piezoelectric type, it is mounted under preload, in this case radially between the first non-rotating element 34 and the second non-rotating element 36. Other types of strain gauge 38 can also be used, in particular strain gauges 38 that do not need to be mounted under preload.

According to the first embodiment, the first non-rotating element 34 is an annular component of longitudinal axis, which has a first inner recess 40 designed to receive the outer ring 28 of the column-top rolling bearing 24. The first inner recess 40 in this case has the form of a groove of which the longitudinal dimension is substantially equal to the longitudinal dimension of the outer ring 28 so that the latter is retained longitudinally in the first inner recess 40. The first non-rotating element 34 in this case has an outer axial surface 42.

The second non-rotating element 36 has a second inner recess 44 formed in an annular body 46 of longitudinal axis so as to receive the first non-rotating element 34. The second inner recess 44 is delimited, on the lower side, by a first radial wall 48 and by an axial wall 50 that form a shoulder in which the first non-rotating element 34 is housed axially. The upper axial end of the second inner recess 44 is delimited by a second radial wall 52 belonging in this case to an end sleeve 54 that is fastened to the annular body 46 by any appropriate means.

In the first embodiment, the second non-rotating element 36 is fastened inside the tube 22.

Each force sensor 32 is in this case directly interposed between the outer axial surface 42 of the first non-rotating element 34 and the axial wall 50 of the second inner recess 44 of the second non-rotating element 36.

The first non-rotating element 34 and the second non-rotating element 36 allow the force sensor 32 to be placed under radial preload if necessary so as to ensure optimal detection of the shear forces, when the forces exerted by the driver on the steering wheel 18 are transmitted to the outer rolling-bearing ring 28. The force sensor 32 therefore measures the longitudinal component of the forces exerted by the driver.

Figure 5:
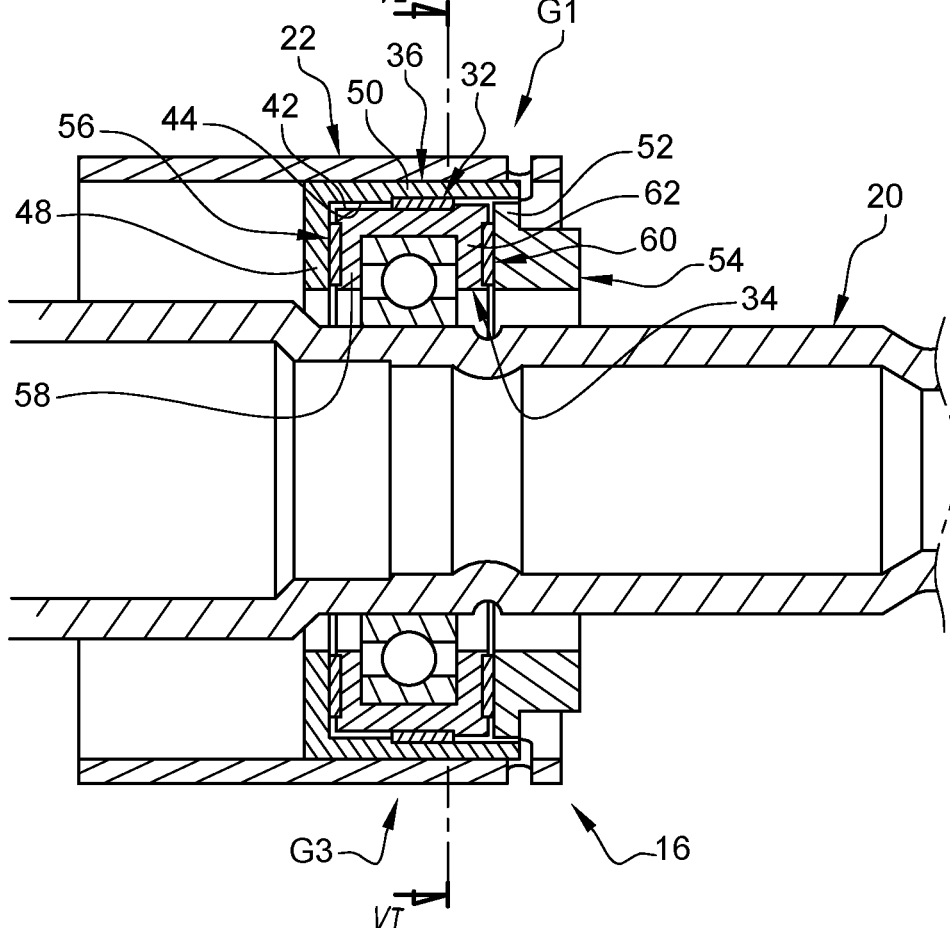
FIG. 5 is a view similar to that in FIG. 3 that shows a second embodiment of the invention.
Figures 6, 7:
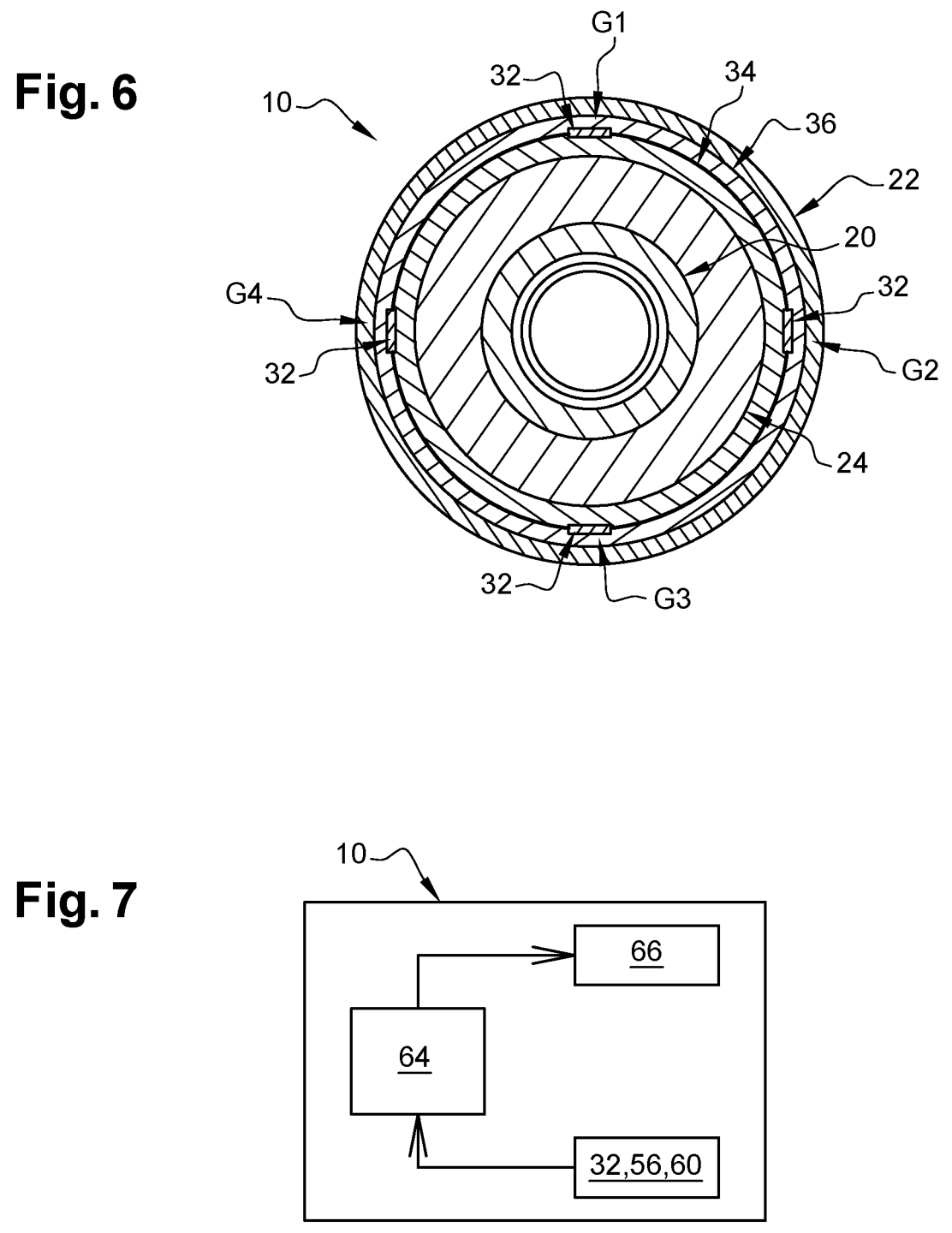

According to a second embodiment, which is shown in FIGS. 5 and 6, a first additional force sensor 56 is arranged between the first radial wall 48 of the second inner recess 44 and a lower radial wall 58 of the first non-rotating element 34, and a second additional force sensor 60 is arranged between an upper radial wall 62 of the first non-rotating element 34 and the second radial wall 52 of the second inner recess 44.

The additional force sensors 56, 60 are for example designed to each detect a longitudinal compressive force. Alternatively, one of the additional sensors 56, 60 can be designed to detect a radial shear force.

In this second embodiment, the force sensor 32, which is arranged between the outer axial surface 42 of the first non-rotating element 34 and the axial wall 50 of the second inner recess 44, can be designed to detect a radial compressive force instead of a shear force.

In the exemplary embodiment shown in FIGS. 5 and 6, there are several groups G1, G2, G3, G4 of force sensors 32, 56, 60 that are distributed circumferentially, in this case every 90 degrees, around the transmission shaft 20. Each group G1, G2, G3, G4 of force sensors 32, 56, 60 in this case has a force sensor 32 mounted radially compressed between the outer axial surface 42 of the first non-rotating element 34 and the axial wall 50 of the second inner recess 44, a first additional force sensor 56 and a second additional force sensor 60. In the view in FIG. 6, only the radially compressed force sensor 32 is visible.

By virtue of these additional force sensors 56, 60, in combination with the force sensor 32, it is possible to detect all the components of a force exerted by the driver on the steering wheel 18 and transmitted via the transmission shaft 20 to the column-top rolling bearing 24, i.e. a longitudinal axial force, a force in a radial direction upwards or downwards, and a force in a radial direction towards the side, i.e. in a horizontal transverse direction corresponding to the transverse axis B1, considering the vehicle 11 in FIG. 1.

It will be noted that, in the case in which there are two groups of additional force sensors 56, 60 that are configured to detect shear forces and are not diametrically opposite one another, such as for example the first group G1 and the second group G2, it is possible to determine the vertical component and the transverse component.

According to a variant of the second embodiment, it is possible to omit one of the additional force sensors 56, 60 in each group G1, G2, G3, G4.

According to a third embodiment (not shown), the first non-rotating element 34 is fastened to the support base 12 of the steering column 10 and the second non-rotating element 36 is arranged on an element of the chassis of the vehicle 11, for example on the crossmember 14.

FIG. 7 shows, in the form of a block diagram, the steering column 10 with its electronic control unit 64 designed to control adjustment motors 66 serving to position the steering column 10 in an appropriate manner. The electronic control unit 64 is configured to control the inclination of the steering column 10 about the transverse axis B1, this allowing the height of the steering wheel 18 to be adjusted for the driver. The electronic control unit 64 can also, with the aid of the adjustment motors 66, control the depth of the steering wheel 18 by adjusting the longitudinal position of the steering wheel 18 along the axis A1.

Advantageously, the electronic control unit 64 is configured to control the steering wheel 18 so that it adopts a retracted state corresponding to the delegated driving mode, in which the driver does not need to manipulate the steering wheel 18, and so that it adopts a standard state corresponding to the manual driving mode, in which the driver controls the steering of the vehicle 11 with the aid of the steering wheel 18.

The force sensors 32, 56, 60 are connected to the electronic control unit 64, this allowing the electronic control unit 64 to measure the values of forces exerted by the driver on the steering wheel 18. The electronic control unit 64 can thus detect a longitudinal force, for example a tensile force, exceeding a predetermined threshold signalling that the driver wishes to take back control of the steering by pulling the steering wheel 18 from the retracted position towards the standard position. To this end, the electronic control unit 64 can use a combination of the following parameters: value and direction of the force, duration and axial position of the steering wheel 18.

According to a variant embodiment, the electronic control unit 64 can also use the information provided by the force sensors 32, 56, 60 so as to detect a particular haptic sequence applied by the driver to the steering wheel 18 with a view to triggering a determined operation. For example, three repeated longitudinal presses within a period of three seconds can allow the driver to control the steering wheel 18 so that it adopts the retracted position. It is also possible to break down the haptic control along the three main axes, this making it possible to quantify the forces necessary for the haptic control in a very precise manner in space.

In this case, the electronic control unit 64 determines the maximum values of the axial force upon the appearance of force peaks, the duration between the peaks, the number of peaks and the direction of the peaks in order to detect a control intention on the part of the driver.

Measuring the forces along a plurality of axes makes it possible to know the value of the force applied to the steering wheel 18 in a plurality of planes. This is advantageous in particular because the driver positioned facing the steering wheel 18 is not always aware of the angle at which he or she applies a force to the steering wheel 18, nor precise in the manner in which he or she applies a force. Thus it is possible to measure the absolute value of the force exerted by the driver along each axis, independently of the direction in which the driver applies force to the steering wheel 18. A direction for applying force is not imposed on the driver.

One advantage of using a plurality of force sensors 32, 56, 60 distributed around the transmission shaft 20 is that it is possible to precisely detect any type of force applied to the steering wheel 18 by the driver, regardless of the orientation of the steering wheel 18 and regardless of the position of the driver with respect to the steering wheel 18.

The invention claimed is:

1. A steering column, comprising:
a support base configured to be mounted fixedly with respect to a chassis of a vehicle,
a steering member on which a vehicle steering wheel is mounted, the steering member including a transmission shaft mounted so as to rotate with respect to the support base about a longitudinal main axis, and
at least one force sensor that is interposed between a first non-rotating element of the steering column and a second non-rotating element belonging either to the steering column or to the chassis of the vehicle and configured to detect longitudinal forces applied to the steering wheel, along the longitudinal main axis, by an individual,
wherein the first non-rotating element is an annular component that defines the longitudinal axis,
wherein the first non-rotating element has a first inner recess designed to receive an outer ring of a rolling bearing of the transmission shaft,
wherein the second non-rotating element has an annular body that also defines the longitudinal axis,
wherein a second inner recess is formed in the annular body so as to receive the first non-rotating element, and
wherein the second inner recess is delimited by a first radial wall and by an axial wall of the annular body and also by a second radial wall belonging to an end sleeve that is fastened to the annular body.

2. The steering column according to claim 1, wherein the at least one force sensor is interposed radially between the first non-rotating element and the second non-rotating element.

3. The steering column according to claim 1, wherein the at least one force sensor is interposed axially between the first non-rotating element and the second non rotating element.

4. The steering column according to claim 1, wherein:
the second non-rotating element is fastened to a tube that is mounted so as to slide longitudinally in the support base so as to be able to adjust the longitudinal position of the steering wheel, and
the transmission shaft is connected to the support base by way of the sliding tube.

5. The steering column according to claim 1, wherein:
the first non-rotating element is fastened to the support base of the steering column, and
the at least one force sensor is arranged on the support base of the steering column so as to be interposed between the support base and an element of the chassis of the vehicle.

6. The steering column according to claim 1, wherein the at least one force sensor has a strain gauge.

7. The steering column according to claim 1, wherein the at least one force sensor is configured to detect a shear force.

8. The steering column according to claim 1, wherein the at least one force sensor is configured to detect a compressive or tensile force.

9. The steering column according to claim 1, wherein the at least one force sensor includes a plurality of force sensors that are distributed circumferentially around the transmission shaft.

10. The steering column according to claim 1, further comprising an electronic control unit that is configured to (i) use the information provided by the at least one force sensor in order to detect a particular haptic sequence applied by the individual to the steering wheel, and (ii) trigger a determined operation depending on the haptic sequence detected.

\* \* \* \* \*